United States Patent Office 3,198,760
Patented Aug. 3, 1965

3,198,760
POLYCHLOROPRENE STABILIZED WITH A PHE-
NOL-TERPENE RESIN AND A METAL RESINATE
AND PROCESS FOR PREPARATION
William M. Widenor, Pensacola, Fla., assignor, by mesne
assignments, to Tenneco Chemicals, Inc., a corporation
of Delaware
No Drawing. Filed Aug. 15, 1961, Ser. No. 131,468
13 Claims. (Cl. 260—27)

This invention relates to the production of neoprene synthetic rubber which is essentially a polymer of 2-chlorobutadiene-1,3, hereinafter referred to as chloroprene, and relates to the products obtained. The present invention is primarily concerned with production of polychloroprene rubber having excellent stability.

A customary method of producing polychloroprene synthetic rubber is to polymerize monomeric chloroprene in an aqueous emulsion. A common procedure is to form an aqueous emulsion of chloroprene with the aid of an emulsifying agent, for example, the sodium salt of rosin which may be added as such, or formed in situ. Various modifiers are usually added as well as a polymerization initiator or promoter. Polymerization proceeds fairly rapidly and it is customary to cool the emulsion to facilitate control of the reaction. When all or substantially all of the chloroprene has polymerized as indicated by the specific gravity of the latex, polymerization is stopped by the addition of an inhibitor. A common method of isolating the polychloroprene from the latex is to apply the latex to a roatating refrigerated drum. The frozen latex containing the coagulated polymer in continuous sheet form is removed from the drum, thawed to melt the ice and washed with water to remove impurities. The rubber is then dried. Prior to freezing the pH value of the latex preferably is adjusted to a slightly acidic value to aid coagulation of the polymer upon freezing of the latex.

Regardless of the method utilized in recovering the polychloroprene from the latex, it is customary to add various modifiers to the emulsion prior to polymerization of the chloroprene to impart the desired physical properties to the rubber. Elemental sulfur is commonly used as a modifier, frequently, in combination with known organic sulfur compounds. Other organic sulfur compounds are often added after polymerization, while the latex is alkaline, for the purpose of plasticizing, and, to a certain extent, stabilizing the finished polymer. However, both sulfur-modified and nonsulfur-modified polychloroprenes are commercially available and are described in published literature. For example, in the book "The Neoprenes," Neil L. Catton, 1952, the following types of polychloroprenes are among those described.

Sulfur-modified:
    "Neoprene Type GN"
    "Neoprene Type GN–A"
    "Neoprene Type GRT"
    "Neoprene Type CG"
    "Neoprene Type KNR"
Nonsulfur-modified:
    "Neoprene Type W"
    "Neoprene Type WRT"
    "Neoprene Type AC"

Sulfur-modified and nonsulfur-modified neoprenes also are described in the book "Rubber: Natural and Synthetic," H. J. Stern, pages 317–333, 1964, Maclaren and Sons Ltd., London. Sulfur-modified neoprene contains the sulfur-polymer linkages formed by reactions of sulfur with chloroprene polymer in the emulsion.

The sulfur-modified polychloroprenes have, in general, very poor storage stability. The nonsulfur-modified neoprenes, for example, "Neoprene Type W," are quite stable on storage. Various stabilizers have been incorporated in neoprenes with varying degrees of success. For example, one of the commercially available sulfur-modified neoprenes is stabilized with tetraethyl thiuram disulfide and has a practical storage life for about three months at normal temperatures. This degree of stabilization is satisfactory for neoprene in the process of manufacture but is not satisfactory for neoprene which is to be stored for long periods prior to being processed into finished goods. Phenyl-α-naphthylamine has been used as a stabilizer but this compound tends to cause discoloration and staining.

It has been discovered that a mixture of terpene-phenol resin and calcium or zinc resinate is an excellent stabilizer for polychloroprene rubber. As used herein, the term "polychloroprene rubber" is used to refer to the raw rubber separated from the latex produced by the emulsion polymerization of chloroprene and in an unvulcanized condition and consisting essentially of polymerized chloroprene which may contain any of the additives or modifiers customarily incorporated in the latex, either prior to or after polymerization. The present stabilizer is essentially composed of 80–95% terpene-phenol resin and 20–5% of resinate with the preferred composition being 90% terpene-phenol resin and 10% resinate with these percentages being based on the total weigh of terpene-phenol resin and resinate.

The terpene-phenol resins are the resinous condensation products of a terpene and a phenol. The resins may be prepared by reacting various terpenes such as dipentene, pinene, limonene and various turpentine cuts with phenols, such as phenol, cresol, alkylated phenols, for example, normal butyl phenol, tertiary butyl phenol, propyl phenol and the like in the presence of a cataylst such as sulfuric acid, sulfonic acid, aluminum chloride, boron trifluoride or the molecular compounds of boron trifluoride with ethers, acids, alcohols and phenols as described in U.S. Patent No. 2,343,845. The disclosure of this patent is incorporated herein by reference. While the terpene phenol resin may be produced by reacting as much as 5 parts of terpene with one part of phenol, we prefer those resins produced by reacting the terpene and phenol in the proportion of about 1–2 moles of the terpene per mole of phenol.

The resinate may be the calcium or zinc salt of resin acids, rosin or modified rosin, such as disproportionated rosin or hydrogenated rosin. The preferred rosin is polymerized rosin. The term "rosin" includes gum rosin, wood rosin and tall oil rosin. Mixtures of calcium and zinc resinates may be used and normally these salts contain about 2–10% by weight of the metal. These known salts may be prepared in any known manner.

The present stabilizer may be incorporated in the chloroprene dispersion prior to polymerization. However, the stabilizer is preferably added to the alkaline latex prior to acidification and coagulation to avoid possible inhibition of the polymerization of the chloroprene. Regardless of when the stabilizer is added it is present in the organic phase of the emulsion.

Very small amounts of the present stabilizer may be used and as little as 0.25 part per 100 parts of neoprene will improve the storage life of the neoprene. However, up to 2.5 parts of stabilizers may be used, although we prefer to use not more than 1.25 parts of stabilizer. It has been found that 0.5 part of the stabilizer will increase the storage life of sulfur-modified neoprene to approximately the same degree as a similar amount of phenyl-α-naphthylamine without the discoloring and staining problems encountered with the amine. The use of only 1.0 part of the present stabilizer enhances the storage stability of a sulfur-modified neoprene such as "Neoprene Type GN" to such a degree that the polymer behaves like "Neoprene Type W," a nonsulfur-modified neoprene. This phenomenon can be studied by means of Mooney viscosity determinations on the raw polymer stored under slightly accelerated conditions, for example, 20 weeks at 100° F. "Neoprene Type W" has excellent storage life with essentially no change in Mooney viscosity on aging. The present stabilizer, unlike some others, does not adversely affect the vulcanizates of neoprene. For example, it has been found that 0.5% of the present stabilizer has no adverse effect on the ozone resistance of "Neoprene Type GN" vulcanizates and that, surprisingly, 1% of the present stabilizer increases the ozone resistance of such vulcanizates. The foregoing percentages are based on the weight of chloroprene polymer.

The following examples illustrate the present invention, it being understood that the present invention is not limited to the particular conditions and proportions except as clearly set forth in the claims and this specification. All parts and percentages are by weight.

*Example 1*

A desirable terpene-phenol resin is prepared by adding 136 grams of alpha pinene and 96 grams of phenol to a flask containing 5 cc. of a molecular compound of boron trifluoride and diethyl ether, the molecular compound containing 50% by weight of boron trifluoride. The reaction flask is immersed in a water bath and the temperature maintained at about 25° C. The pinene-phenol mixture is added slowly to the flask and catalyst over a period of about 30 minutes. At the end of this period the reaction is substantially complete and the pinene-phenol resin is separated by steam distillation. This pale resin is then blended with the calcium salt of polymerized rosin containing about 3.5% calcium in the proportions of 90 parts of pinene-phenol resin and 10 parts of calcium resinate to form the stabilizer referred to in the following examples.

*Example 2*

A stable polychloroprene rubber, neoprene, is produced by emulsifying 100 parts of chloroprene containing 4 parts of wood rosin and 0.25 part of sulfur in a solution of 160 parts of water containing 0.83 part of sodium hydroxide and 0.75 part of the sodium salt of naphthalene sulfonic acid-formaldehyde condensation product ("Daxad-11"). The temperature is maintained at 40° C. during the reaction and polymerization is initiated and maintained by adding in small increments 0.3 part of potassium persulfate in a 5% aqueous solution. The progress of polymerization is followed by periodically determining the specific gravity of the emulsion. When the specific gravity is 1.069, indicating polymerization of about 91% of the chloroprene, 0.25 part of sodium bisulfite is added as 2.5% aqueous solution to destroy any excess potassium persulfate. Polymerization is stopped by adding 0.5 part of tetraethyl thiuram disulfide. The latex is cooled to 20° C. and aged at this temperature for eight hours to plasticize the chloroprene polymer by the action of the tetraethyl thiuram disulfide on the polymer-sulfur linkages. This disulfide also acts as a stabilizer in the finished dry polymer.

A water emulsion of 1.0 part of the stabilizer (blend of terpene-phenol resin and calcium resinate) of Example 1 dissolved in toluene is added to the aged, alkaline latex with agitation. The latex is acidified with 10% acetic acid to a pH value in the range of 5.5–5.8. The acetic acid by lowering the pH of the latex arrests the plasticizing action and precipitates the rosin which the polymer tends to retain. The primary purpose of the acetic acid is to prepare the latex for coagulation by freezing.

The neoprene is isolated from the acidified latex by continuous coagulation of the polymer film on a freeze drum maintained at −15° C. The frozen film of latex containing the coagulated polymer in film form is continuously stripped from the freeze roll and washed with warm water. The wet neoprene is then dried in a circulating air oven. The dried rubber contains the uniformly distributed stabilizer.

In this example, the wood rosin and sodium hydroxide react to form a rosin soap which is an emulsifier. The "Daxad–11" stabilizes the acidified latex and prevents premature coagulation of the neoprene.

The neoprene of this example has good storage stability as shown by accelerated storage studies at 100° F. in a constant temperature oven over a period of 20 weeks during which the Mooney viscosity is plotted against the storage time. The curve for the stabilized neoprene does not dip as does "Neoprene Type GN." The neoprene stabilized with about 1.0% of the present stabilizer has a stability similar to that of "Neoprene Type W." When "Neoprene Type W" is subjected to storage at somewhat higher than normal temperature and the Mooney viscosity plotted against storage time, an essentially straight line is obtained.

*Example 3*

A stabilized neoprene rubber is prepared the same as described in Example 2 except that only 0.5 part of the stabilizer of Example 1 is added to the latex. The dried rubber is more stable than the same neoprene without the present stabilizer. However, with 0.5% of the present stabilizer the "Mooney Curve" plotted from the accelerated test will dip but not as much as the same curve for "Neoprene Type GN."

Vulcanizates can be prepared utilizing the stabilized neoprenes of Examples 2 and 3 in the same manner as vulcanizates are prepared from "Neoprene Type GN." For example, the following ingredients may be mixed on an open mill and the sheets press cured at 292° F. for 50 minutes.

|  | Parts by Weight | |
| --- | --- | --- |
| Stabilized Neoprene of Ex. 2 | 100 | 100 |
| Stabilized Neoprene of Ex. 3 |  | 100 |
| Stearic Acid | 0.5 | 0.5 |
| Lt. Magnesium Oxide | 4.0 | 4.0 |
| Zinc Oxide | 5.0 | 5.0 |
| Carbon Black | 37.5 | 37.5 |
| Totals | 147.0 | 147.0 |

Ozone resistance is determined by test under a vigorous set of conditions. Specimens ½ inch by 4 inches by 0.075 inch of the two vulcanizates described above and a similar vulcanizate of "Neoprene Type GN" are stretched 0–25%, 30 cycles per minute, for both 16 and 24 hour test periods, respectively, while exposed to an ozone concentration of 100 p.p.h.m./vol. The specimen containing 0.5% of the present stabilizer is as resistant to ozone as the "Neoprene Type GN" vulcanizate. The specimen containing 1% of the present stabilizer has better resistance to ozone than "Neoprene Type GN" vulcanizate.

*Example 4*

Stabilized neoprenes are prepared by the same procedures and utilizing the same quantities of materials as set forth in Examples 2 and 3 except for the addition of the stabilizer of Example 1 prior to polymerization. In other words, the 1 part and 0.5 part, respectively, of the stabilizer is added to the monomeric chloroprene prior to emulsification. While the resulting neoprenes have improved storage stability the polymerization reaction tends to be slower than when the stabilizer is added as described in Example 2.

It is to be understood that various modifications can be made. For example, the present stabilizer may be prepared by blending the terpene-phenol resin prepared by condensing α-pinene and phenol, as described in Example 1, with the zinc salt of polymerized rosin, the salt containing about 3% of metal.

I claim:
1. A polychloroprene rubber comprising polychloroprene and a stabilizing amount of a stabilizer containing 80–95% of terpene-phenol resin and 20–5% of metal resinate selected from the group consisting of calcium resinate, zinc resinate, and mixtures thereof.
2. A sulfur-modified polychloroprene rubber comprising sulfur-modified chloroprene polymer and stabilizer containing 80–95% of terpene-phenol resin and 20–5% of metal resinate selected from the group consisting of calcium resinate, zinc resinate, and mixtures thereof, the amount of said stabilizer being in the range of 0.25–2.5% of said homopolymer.
3. A sulfur-modified polychloroprene rubber as claimed in claim 2 in which the amount of said stabilizer is in the range of 0.5–1.25% of said homopolymer.
4. A sulfur-modified polychloroprene rubber as claimed in claim 2 in which said terpene-phenol resin is the resinous reaction product of a terpene and a phenol in a mol ratio of 1–2 mols of terpene per mol of phenol.
5. A sulfur-modified polychloroprene rubber as claimed in claim 4 in which said terpene is $\alpha$-pinene.
6. A sulfur-modified polychloroprene rubber as claimed in claim 2 in which said resinate is the calcium salt of polymerized wood rosin.
7. An aqueous alkaline latex comprising an aqueous dispersion of sulfur-modified polychloroprene containing 0.25–2.5% of stabilizer based on the polychloroprene, said stabilizer containing 80–95% of terpene-phenol resin and 20–5% of a metal resinate selected from the group consisting of calcium resinate, zinc resinate, and mixtures thereof.
8. The process of producing sulfur-modified polychloroprene rubber comprising forming an alkaline latex of sulfur-modified polychloroprene containing a stabilizer including 80–95% of terpene-phenol resin and 20–5% of metal resinate selected from the group consisting of calcium resinate, zinc resinate, and mixtures thereof, the amount of said stabilizer being in the range of 0.25–2.5% of said polychloroprene, and thereafter separating said polychloroprene containing said stabilizer from the latex.
9. In the process of producing sulfur-modified polychloroprene rubber by polymerizing chloroprene in an alkaline aqueous emulsion and in the presence of sulfur to form an alkaline latex containing sulfur-modified polychloroprene, acidifying the latex, and coagulating the polychloroprene, the step of incorporating in the organic phase of said alkaline latex a stabilizer containing 80–95% of terpene-phenol resin and 20–5% of metal resinate selected from the group consisting of calcium resinate, zinc resinate and mixtures thereof, the amount of said stabilizer being in the range of 0.5–1.25% of said polychloroprene.
10. The process of producing sulfur-modified polychloroprene rubber as claimed in claim 9 in which the stabilizer is added to the latex after polymerization of the chloroprene and prior to the acidification step.
11. The process of producing sulfur-modified polychloroprene rubber as claimed in claim 10 in which the terpene-phenol resin is the resinous reaction product of a terpene and a phenol in a mol ratio of 1–2 mols of terpene per mol of phenol.
12. The process of producing sulfur-modified polychloroprene rubber as claimed in claim 11 in which said terpene is $\alpha$-pinene.
13. The process of producing sulfur-modified polychloroprene rubber as claimed in claim 9 in which said metal resinate is the calcium salt of polymerized wood rosin.

References Cited by the Examiner
UNITED STATES PATENTS

| | | | |
|---|---|---|---|
| 2,537,636 | 1/51 | Kitchen | 260—45.95 |
| 2,553,816 | 5/51 | Ebel | 260—27 |
| 2,707,180 | 4/55 | Maynard | 260—92.3 |
| 2,965,604 | 12/60 | Heinz et al. | 260—45.95 |

LEON J. BERCOVITZ, *Primary Examiner.*
ALPHONSO D. SULLIVAN, *Examiner.*